US006712462B2

(12) United States Patent
Ito et al.

(10) Patent No.: US 6,712,462 B2
(45) Date of Patent: Mar. 30, 2004

(54) INK SET AND INK JET RECORDING METHOD

(75) Inventors: Jun Ito, Nagano (JP); Miharu Kanaya, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/143,513

(22) Filed: May 10, 2002

(65) Prior Publication Data

US 2003/0150354 A1 Aug. 14, 2003

(30) Foreign Application Priority Data

| May 14, 2001 | (JP) | ............................................ | 2001-143836 |
| May 14, 2001 | (JP) | ............................................ | 2001-143837 |
| May 14, 2001 | (JP) | ............................................ | 2001-143838 |

(51) Int. Cl.$^7$ .................................................. B41J 2/01
(52) U.S. Cl. ...................... 347/100; 347/96; 106/31.13; 106/31.27
(58) Field of Search ................................. 347/100, 101, 347/96, 95; 106/31.13, 31.27

(56) References Cited

U.S. PATENT DOCUMENTS 6,511,169 B1 * 1/2003 Gallo et al. .................. 347/100

FOREIGN PATENT DOCUMENTS

| EP | 1048705 A1 * | 4/2000 | ........... C09D/11/00 |
| JP | 575769 | 1/1982 | |
| JP | 62192474 | 8/1987 | |
| JP | 2127482 | 5/1990 | |
| JP | 5214259 | 8/1993 | |
| JP | 8310116 | 11/1996 | |
| JP | 93380 | 1/1997 | |
| JP | 6319288 | 1/1998 | |
| JP | 10306221 | 11/1998 | |
| JP | 1129730 | 2/1999 | |
| JP | 11158429 | 6/1999 | |
| JP | 11199809 | 7/1999 | |
| JP | 19881 | 1/2001 | |
| WO | 9624636 | 8/1996 | |
| WO | WO 02/070609 A1 * | 9/2002 | ........... C09B/43/16 |

OTHER PUBLICATIONS

Patent Abstracts of Japan Publication No. 57005769 A dated Jan. 12, 1982.
Patent Abstracts of Japan Publication No. 62192474 A dated Aug. 24, 1987.
Patent Abstracts of Japan Publication No. 63019288 A dated Jan. 27, 1988.
Patent Abstracts of Japan Publication No. 10306221 A dated Nov. 17, 1998.
Patent Abstracts of Japan Publication No. 11029730 A dated Feb. 2, 1999.
Patent Abstracts of Japan Publication No. 11158429 A dated Jun. 15, 1999.
Patent Abstracts of Japan Publication No. 2001019881 A dated Jan. 23, 2001.
Patent Abstracts of Japan Publication No. 02127482 A dated May 16, 1990.
Patent Abstracts of Japan Publication No. 05–214259 dated Aug. 24, 1993.
Patent Abstracts of Japan Publication No. 08310116 A dated Nov. 26, 1996.
Patent Abstracts of Japan Publication No. 09003380 A dated Jan. 7, 1997.
Patent Abstracts of Japan Publication No. 11199809 A dated Jul. 27, 1999.

* cited by examiner

*Primary Examiner*—Stephen D. Meier
*Assistant Examiner*—Manish Shah
(74) *Attorney, Agent, or Firm*—Ladas & Parry

(57) ABSTRACT

An ink set and a recording method are provided according to which light-fastness is good, and color reproducibility, clogging properties and other properties are satisfied, by using an ink set including inks each of which contains at least a dye, a water-soluble organic solvent and water, the ink set including a combination of magenta ink that contains a specific dye, yellow ink and cyan ink.

28 Claims, No Drawings

INK SET AND INK JET RECORDING METHOD

TECHNICAL FIELD

The present invention relates to an ink set that is suitable in particular for an ink jet recording method, and the ink jet recording method.

BACKGROUND ART

In an ink jet recording method, recording is carried out by discharging a recording liquid from minute nozzles provided in a recording head through the vibration of piezoelectric elements, the action of thermal energy or the like; the method has advantages such as quietness during recording, it being possible to obtain high-resolution images at high speed by using a high-density head, and running costs being low. The method is thus used in various recording fields such as printers for personal computers, video printers, and graphics printers.

In the case of forming color images using the ink jet recording method, inks of at least the three primary colors magenta, yellow and cyan are used, and recording of full-color images is carried out by controlling the discharged amount and dot density of each of the inks and thus carrying out subtractive color mixing. In recent years, a method has become common in which, to obtain high-resolution images, for the magenta and cyan inks, dark and light inks having a different density to one another are used to reduce the sensation of graininess, whereby finer images can be obtained. It is important that each of the inks itself has excellent color reproducibility, and it is also important that good color reproducibility can be realized when printing is carried out combining the dark and light magenta ink, yellow ink and dark and light cyan ink to form red, green, blue and black.

Furthermore, water-based inks are mainly used as ink jet inks from a safety perspective with regard to odor, fire prevention and so on, and various characteristics are demanded of these inks, for example values of physical properties such as the viscosity and surface tension being insuitable ranges, nozzle clogging properties and storage stability being excellent, recorded images with high density (high optical density, vivid tones) being provided, and light-fastness and water resistance being excellent.

Most of these properties are satisfied by using a water-based ink having water or a mixed liquid of water and a water-soluble organic solvent as a main solvent, but color reproducibility, vividness, light-fastness and so on are greatly influenced by the colorant used, and hence various dyes have been investigated from hitherto. In answer to the above demands, in Japanese Patent Application Laid-open No. H5-214259, Japanese Patent Application Laid-open No. H8-310116, Japanese Patent Application Laid-open No. H9-3380, and Japanese Patent Application Laid-open No. H11-199809, it has been disclosed that excellent color reproducibility and light-fastness can be obtained even for secondary colors and tertiary colors through ink sets that use specific dye sets.

Moreover, the properties of magenta ink are poor with regard to light-fastness in particular, and hence in Japanese Patent Application Laid-open No. S57-5769, WO 96/24636, Japanese Patent Application Laid-open No. S62-192474, Japanese Patent Application Laid-open No. S63-19288, Japanese Patent Application Laid-open No. H10-306221, Japanese Patent Application Laid-open No. H1-29730, Japanese Patent Application Laid-open No. H11-158429, Japanese Patent Application Laid-open No. 2001-19881 and so on, magenta dye inks having excellent tone, vividness and light-fastness have been disclosed. Moreover, in Japanese Patent Application Laid-open No. H2-127482, a recording method has been disclosed using dark and light inks in which the type of dye differs between the dark ink and the light ink.

However, with printed articles produced through conventional inkjet recording using such dyes, there is a problem that the printed article fades upon exposure to light. Fading is particularly marked with a single magenta ink color, and as a result there is a problem that fading is also great with secondary and tertiary colors such as red, blue and composite black. Furthermore, it is still not possible to provide color printing with high resolution and fastness as a color recording method, for example storage reliability with regard to clogging properties, discharge stability and so on, and toning and color reproducibility are insufficient.

Moreover, in the above-mentioned recording method, reliability with regard to ink clogging and so on, tone, vividness and light-fastness may not be at a sufficiently satisfactory level, and even if light-fastness is excellent with a single color, when mixing with another color light fading is promoted through interaction with the other color, and as a result it is still not possible to provide excellent images in the case of full color image formation.

It is thus an object of the present invention to resolve these problems. That is, it is an object of the present invention to provide an ink set according to which light-fastness is excellent, storage stability with regard to clogging, discharge stability and so on is good, and tone, color reproducibility and other properties are satisfied, and a recording method using this ink set.

Moreover, it is an object of the present invention to provide a magenta ink according to which reliability with regard to clogging and so on is high, coloration in the case of a single color is excellent, vividness and light-fastness are obtained, and color images can be obtained that have excellent vividness and light-fastness even in mixed color parts were mixing is carried out with an ink of another color.

DISCLOSURE OF THE INVENTION

The above-mentioned objects are attained through the following invention.

An ink set of the present invention is an ink set that comprises inks each of which contains at least a dye, a water-soluble organic solvent and water, and that comprises a combination of magenta ink that contains a dye having a structure shown in general formula (I) below, yellow ink, and cyan ink.

General formula [I]:

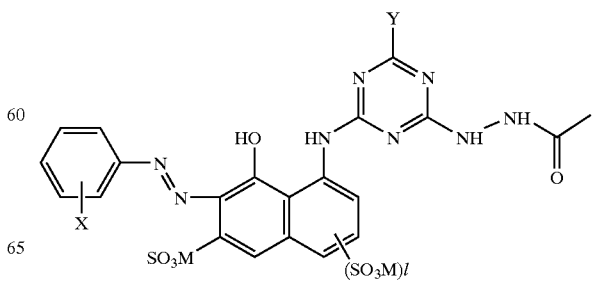

-continued

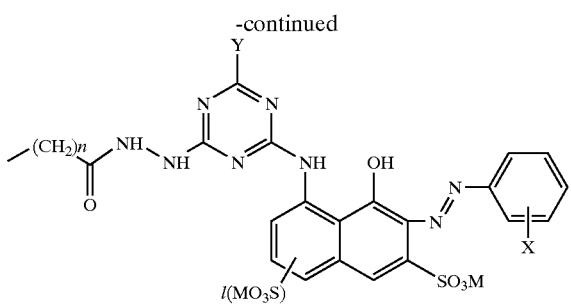

X: —COOM or —SO$_3$M
Y: —H, —NH$_2$ or —O(CH$_2$)$_m$H
M: —H, —Li, —Na, —K, —NH$_4$ or —NH(CH$_2$OH)$_3$
n=integer from 2 to 10
m=integer from 1 to 4
l=0 or 1

Moreover, in the ink set of the present invention, the yellow ink may be one that contains at least one dye selected from the group consisting of a dye containing C.I. Direct Yellow 86 and C.I. Direct Yellow 132 in a weight ratio of 1:3 to 3:1, and a dye containing C.I. Direct Yellow 86 and C.I. Direct Yellow 173 in a weight ratio of 1:4 to 4:1, and the cyan ink may be one that contains at least one dye selected from the group consisting of C.I. Direct Blue 86 and C.I. Direct Blue 199.

Moreover, the magenta ink in the ink set of the present invention may be dark and light magenta ink comprising dark magenta ink containing a dye having a structure shown in general formula (I) above, and light magenta ink containing a dye having a structure shown general formula (II) below.

General formula (II):

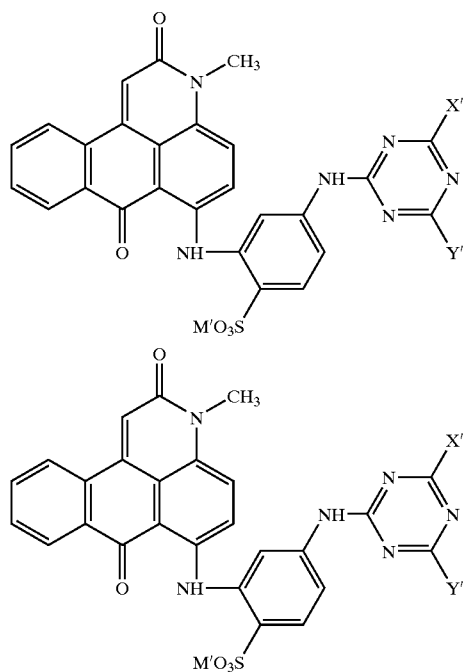

(where X' indicates an anilino group substituted with at least one SO$_3$M;

Y' indicates OH, Cl or a morpholino group;
M' indicates H, Li, Na, K, ammonium, or an organic amine.)

Moreover, in the ink set of the present invention, the magenta ink may be dark and light magenta ink comprising dark magenta ink containing a dye having a structure shown in general formula (I) above, and light magenta ink containing a dye having a structure shown in general formula (II) above, the yellow ink may be one containing at least one dye selected from the group consisting of a dye containing C.I. Direct Yellow 86 and C.I. Direct Yellow 132 in a weight ratio of 1:3 to 3:1, and a dye containing C.I. Direct Yellow 86 and C.I. Direct Yellow 173 in a weight ratio of 1:4 to 4:1, and the cyan ink may be dark and light cyan ink containing at least one dye selected from the group consisting of C.I. Direct Blue 86 and C.I. Direct Blue 199.

Furthermore, the present invention also relates to an ink jet recording method of forming a color image using at least dark and light magenta ink, yellow ink, and dark and light cyan ink, the ink jet recording method using the above-mentioned ink set.

BEST MODE FOR CARRYING OUT THE INVENTION

By carrying out ink jet recording using an ink set according to the present invention, multi-color images can be provided having excellent storage stability, color reproducibility and other properties, with light-fastness being good not only for single colors but also secondary colors and tertiary colors. Following is a detailed description of the present invention, citing preferable embodiments of the present invention.

An ink set of the present invention is an ink set that comprises inks each of which contains at least a dye, a water-soluble organic solvent and water, and that comprises a combination of magenta ink that contains a dye having a structure shown in general formula (I) below, yellow ink, and cyan ink.

General formula [I]:

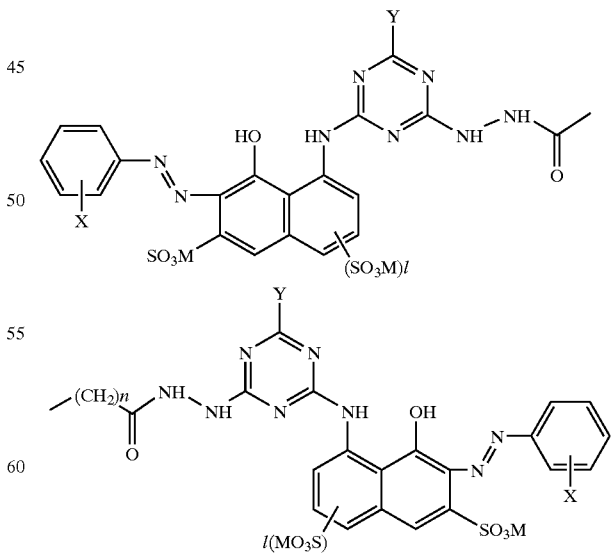

X: —COOM or —SO$_3$M
Y: —H, —NH$_2$ or —O(CH$_2$)$_m$H

M: —H, —Li, —Na, —K, —NH$_4$ or NH(CH$_2$OH)$_3$ n=integer from 2 to 10 m=integer from 1 to 4 l=0 or 1

In the above ink set, the yellow ink may be one that contains at least one dye selected from the group consisting of a dye containing C.I. Direct Yellow 86 and C.I. Direct Yellow 132 in a weight ratio of 1:3 to 3:1, and a dye containing C.I. Direct Yellow 86 and C.I. Direct Yellow 173 in a weight ratio of 1:4 to 4:1, and the cyan ink may be one that contains at least one dye selected from the group consisting of C.I. Direct Blue 86 and C.I. Direct Blue 199. By carrying out ink jet recording using this ink set, recorded image having high vividness and excellent light-fastness can be obtained.

The dye having a structure shown in general formula (I) above is preferably a water-soluble dye.

The following specific examples can be given of the dye represented by general formula (I) used in the magenta ink, but there is no limitation to these.

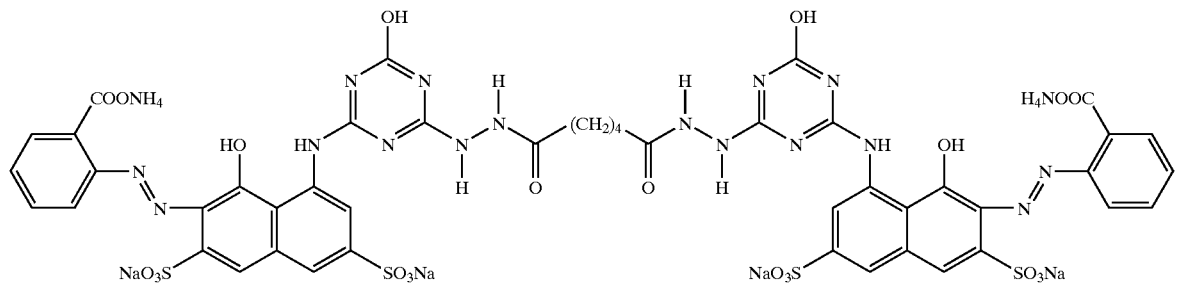

(M-1)

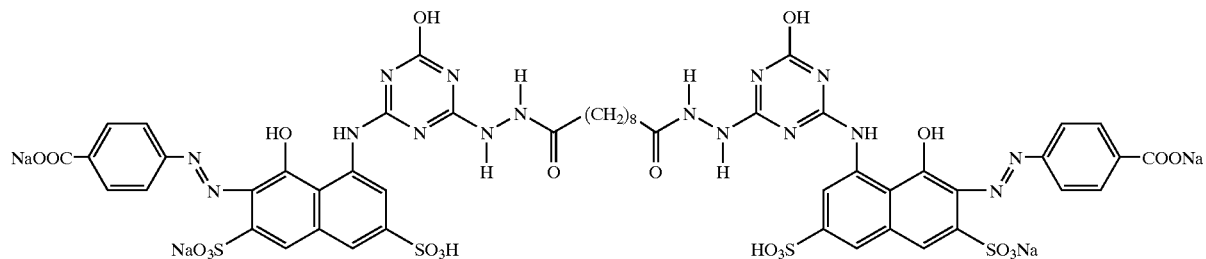

(M-2)

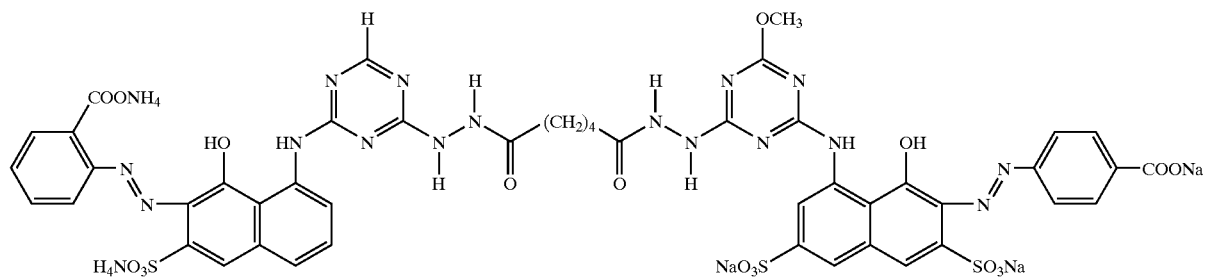

(M-3)

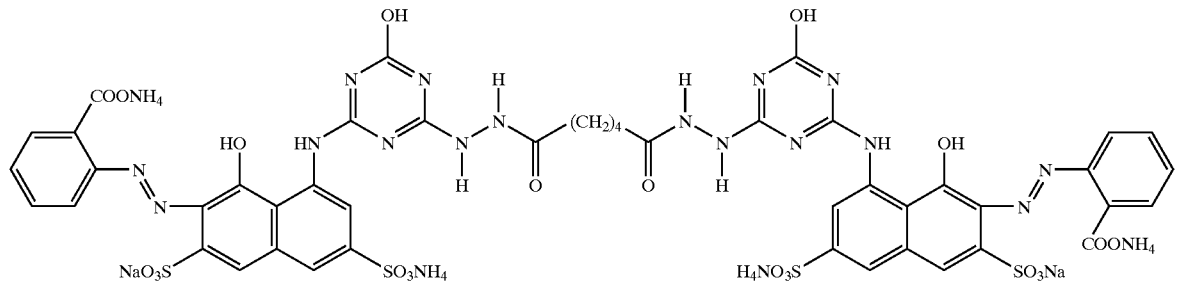

(M-4)

-continued
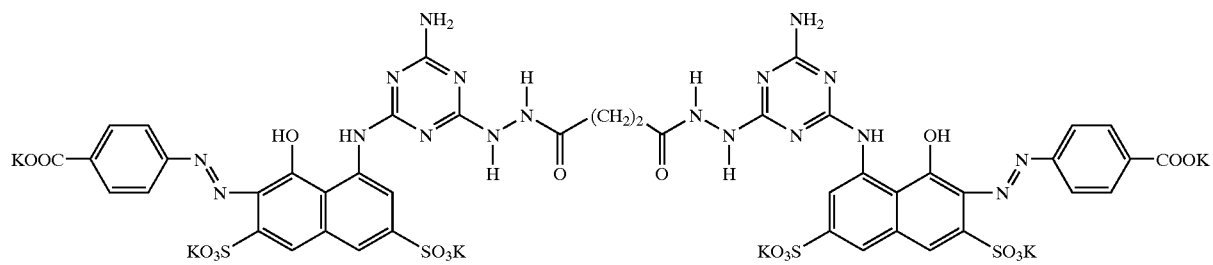
(M-5)
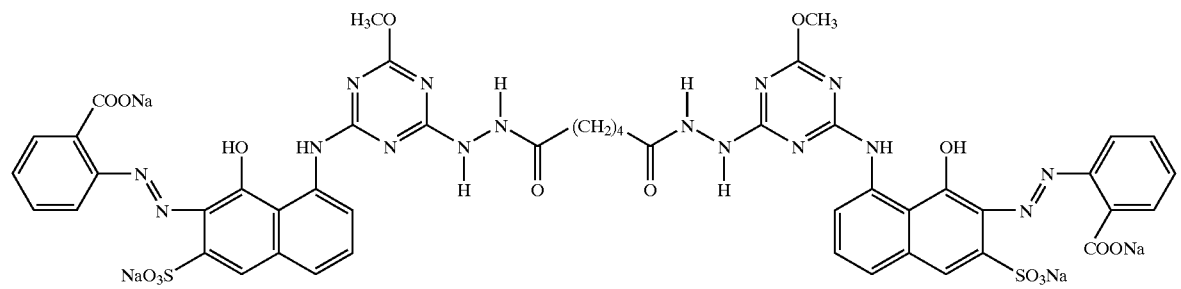
(M-6)
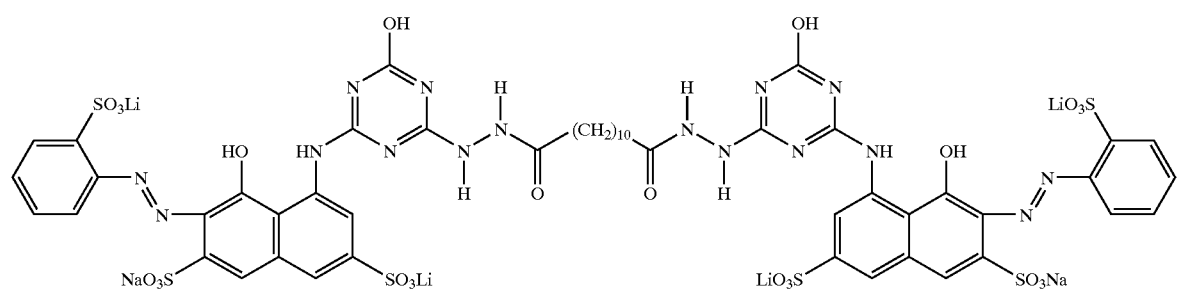
(M-7)
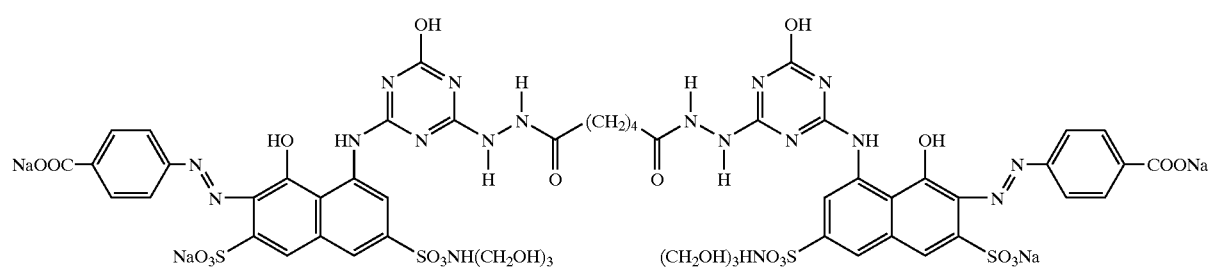
(M-8)
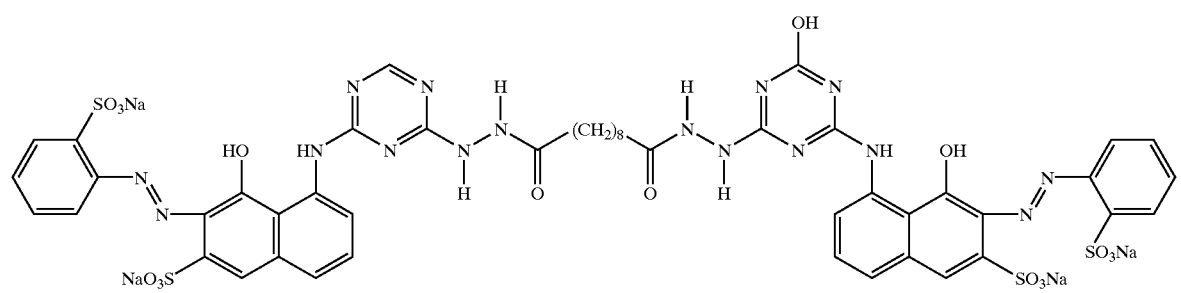
(M-9)

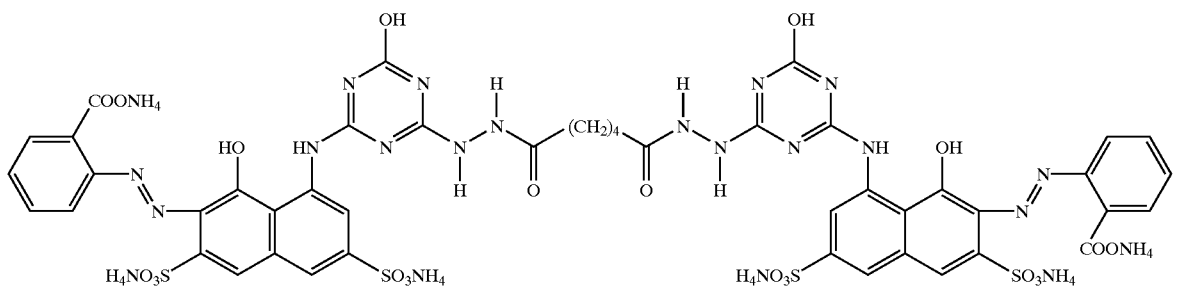

(M-10)

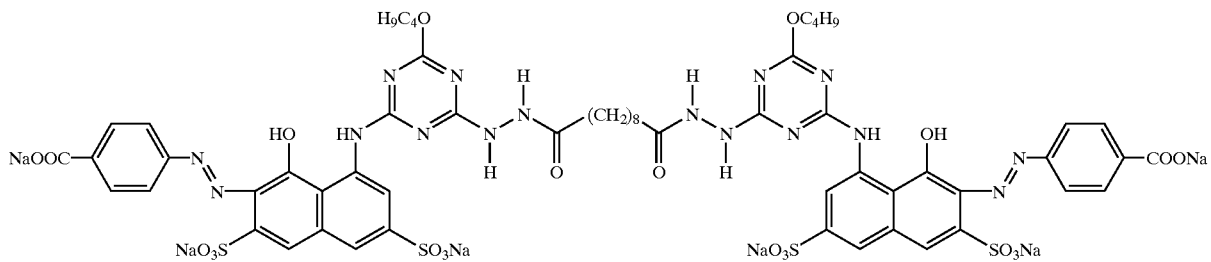

(M-11)

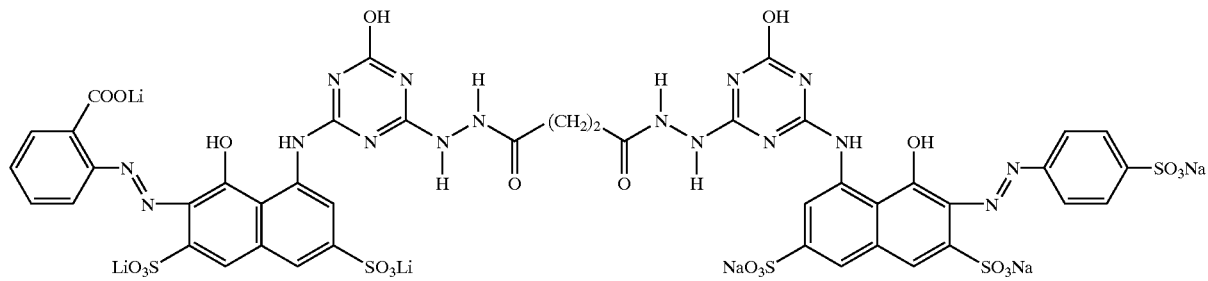

(M-12)

It is preferable for the magenta ink to contain 1.0 to 4.0 wt % of the dye shown in above-mentioned general formula (I) relative to the total amount of the magenta ink, the yellow ink to contain 0.3 to 4.0 wt % of at least one dye selected from the group consisting of a dye containing C.I. Direct Yellow 86 and C.I. Direct Yellow 132 in a weight ratio of 1:3 to 3:1, and a dye containing C.I. Direct Yellow 86 and C.I. Direct Yellow 173 in a weight ratio of 1:4 to 4:1, relative to the total amount of the yellow ink, and the cyan ink to contain 1.0 to 4.0 wt % of at least one dye selected from the group consisting of C.I. Direct Blue 86 and C.I. Direct Blue 199 relative to the total amount of the cyan ink. By making the dye contents be in these ranges, printing density and vividness, and reliability of the ink jet ink, for example ink clogging properties and discharge stability, can be secured.

Moreover, in the above ink set, the magenta ink may be dark and light magenta ink comprising dark magenta ink containing a dye having a structure shown in general formula (I) above, and light magenta ink containing a dye having a structure shown in general formula (II) below.

General formula (II):

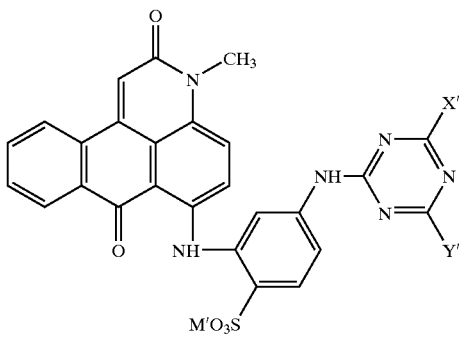

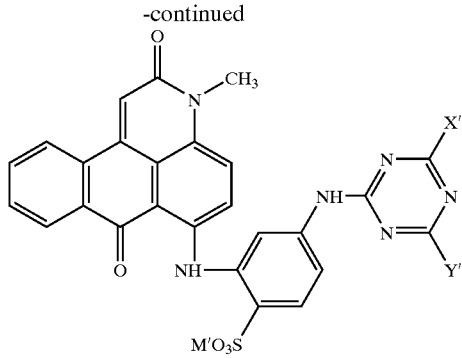

(where X' indicates an anilino group substituted with at least one SO$_3$M:

Y' indicates OH, Cl or a morpholino group; and

M' indicates H, Li, Na, K, ammonium, or an organic amine.)

By carrying out ink jet recording using this ink set, recorded images having high vividness and excellent light-fastness can be obtained.

The magenta dyes shown in general formula (I) and general formula (II) above are preferably water-soluble dyes.

It is preferable for the dark magenta ink to contain 1 to 5 wt % of the dye having a structure shown in general formula (I) above relative to the total weight of the dark magenta ink, and for the light magenta ink to contain 0.5 to 4 wt % of the dye having a structure shown in general formula (II) above relative to the total weight of the light magenta ink.

The magenta dye represented by general formula (I) for the dark ink has extremely good vividness and light-fastness as a single color. Specific examples are the dyes shown as (M-1) to (M-12) above, but there is no limitation to these.

The dye concentration in the dark ink depends on the color value of the dye, but by making the ink contain the dye in an amount in a range of 1 to 5 wt %, sufficient coloring and density can be obtained. More suitably, the dye concentration is preferably such that the magenta OD value is 1.0 to 1.5 when solid printing (printing of completely filled-in blocks with 100% duty) is carried out on so-called normal paper, i.e. in a range of 1.5 to 3.5 wt %.

Moreover, the magenta dye represented by general formula (II) for the light ink has relatively good light-fastness as a single color, although not as good as that of the dye of general formula (I). When mixed with inks of other colors in particular, the magenta dye represented by general formula (II) has an action of not promoting light fading of other colors or white. Specific examples are the dyes shown below, but there is no limitation to these.

LM-1

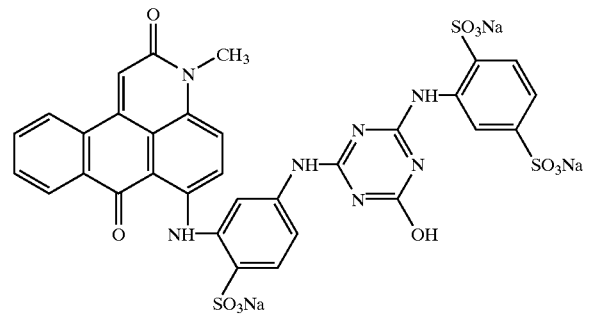

LM-2

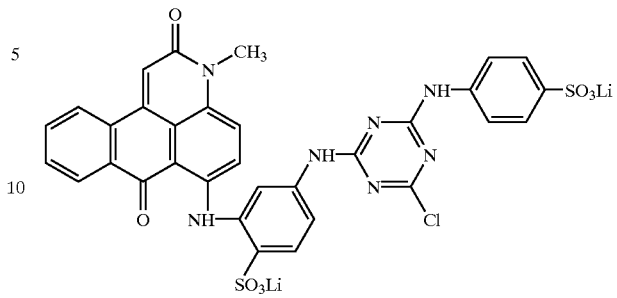

LM-3

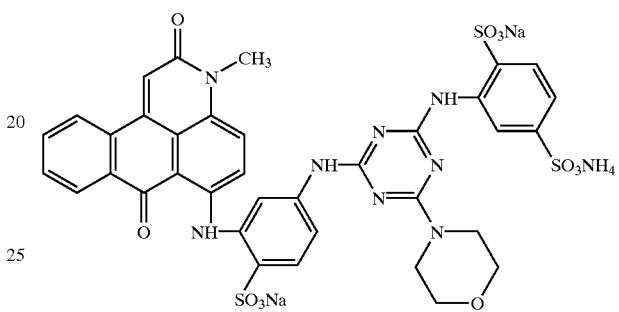

LM-4

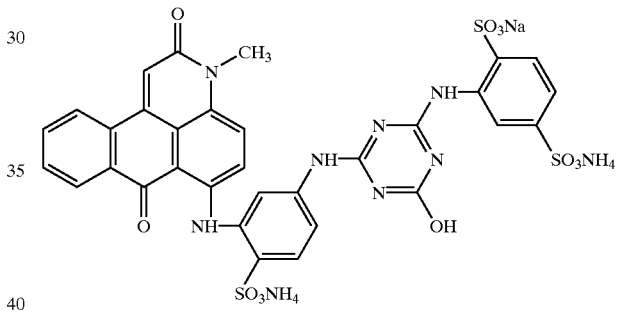

LM-5

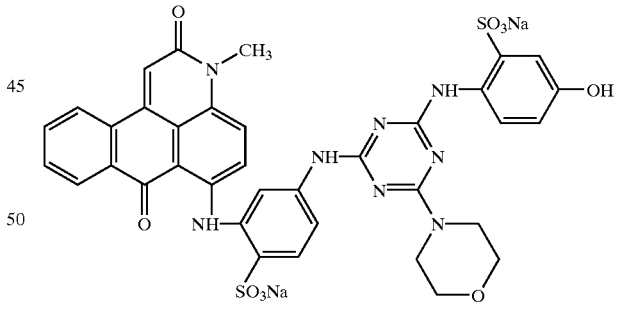

LM-6

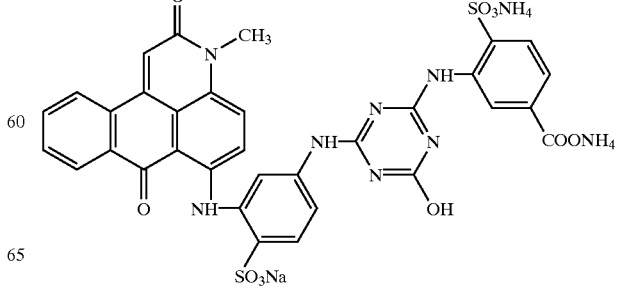

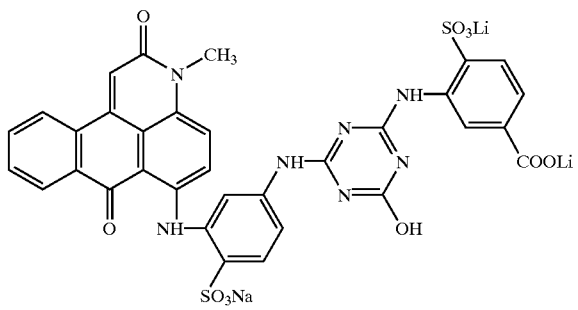

LM-7

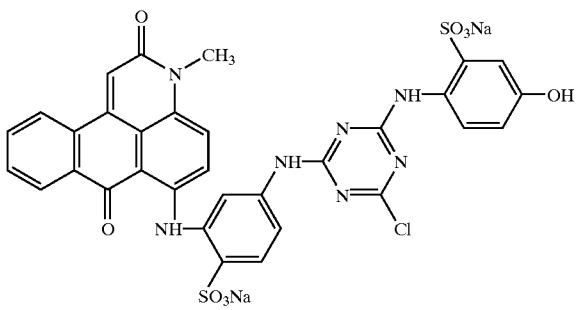

LM-8

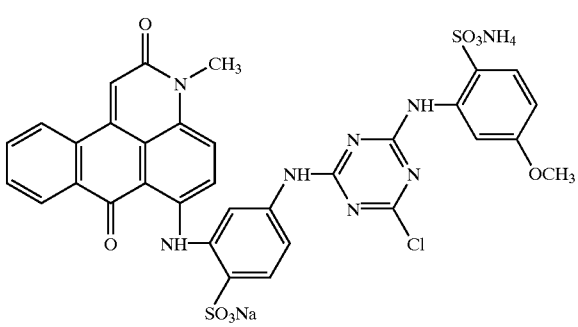

LM-9

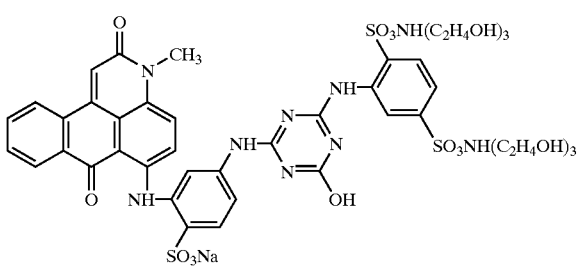

LM-10

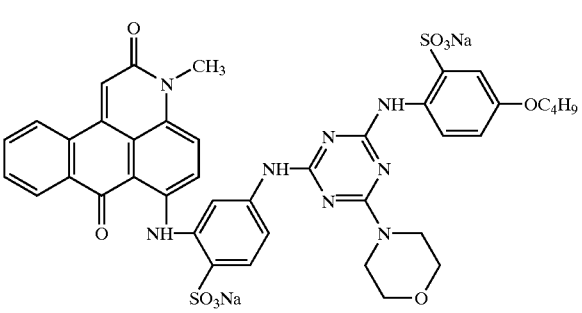

LM-11

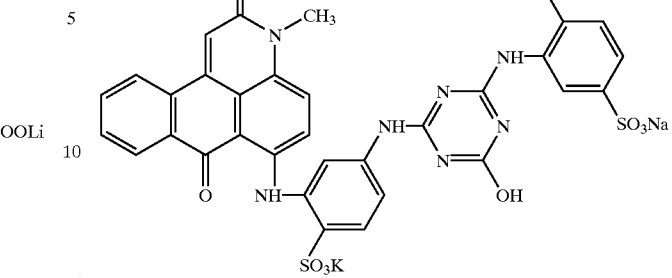

LM-12

The dye concentration in the light ink depends on the color value of the dye and the color balance when combined with the dark magenta ink, but by making the ink contain the dye in an amount in a range of 0.5 to 4 wt %, sufficient coloring and density can be obtained, and moreover the balance with the dark ink will be good. More suitably, the dye concentration is preferably such that the magenta OD value of the light ink is about 25% of the OD value of the dark magenta ink, i.e. in a range of 0.25 to 0.75, when solid printing (100% duty) is carried out on so-called normal paper, i.e. the dye concentration is preferably in a range of 1 to 3 wt %.

Moreover, in the above ink set, the magenta ink may be dark and light magenta ink comprising dark magenta ink containing a dye having a structure shown in general formula (I) above, and light magenta ink containing a dye having a structure shown in general formula (II) above, the yellow ink may be one containing at least one dye selected from the group consisting of a dye containing C.I. Direct Yellow 86 and C.I. Direct Yellow 132 in a weight ratio of 1:3 to 3:1, and a dye containing C.I. Direct Yellow 86 and C.I. Direct Yellow 173 in a weight ratio of 1:4 to 4:1, and the cyan ink may be dark and light cyan ink containing at least one dye selected from the group consisting of C.I. Direct Blue 86 and C.I. Direct Blue 199. By carrying out ink jet recording using this ink set, recorded images having high vividness and excellent light-fastness can be obtained.

It is preferable for the dark magenta ink to contain 1.0 to 4.0 wt % of the dye shown in general formula (I) above relative to the total weight of the dark magenta ink, for the light magenta ink to contain 0.5 to 3.0 wt % of the dye shown in above-mentioned general formula (II) relative to the total weight of the light magenta ink, for the yellow ink to contain 0.3 to 4.0 wt % of at least one dye selected from the group consisting of a dye containing C.I. Direct Yellow 86 and C.I. Direct Yellow 132 in a weight ratio of 1:3 to 3:1, and a dye containing C.I. Direct Yellow 86 and C.I. Direct Yellow 173 in a weight ratio of 1:4 to 4:1, relative to the total weight of the yellow ink, and for the dark and light cyan ink to comprise dark cyan ink containing 1.0 to 4.0 wt % of at least one dye selected from the group consisting of C.I. Direct Blue 86 and C.I. Direct Blue 199 relative to the total weight of the dark cyan ink, and light cyan ink containing 0.5 to 3.0 wt % of at least one dye selected from the group consisting of C.I. Direct Blue 86 and C.I. Direct Blue 199 relative to the total weight of the light cyan ink. By making the dye contents be in these ranges, printing density and vividness, and reliability of the inkjet ink, for example ink clogging properties and discharge stability, can be secured.

Specific examples of the dye represented by general formula (I) used in the dark magenta ink are previously mentioned (M-1) to (M-12), but there is no limitation to these.

Specific examples of the dye represented by general formula (II) used in the light magenta ink are previously mentioned (LM-1) to (LM-12), but there is no limitation to these.

In addition to the specific dyes described above, the magenta ink, yellow ink and cyan ink described above also each contains water or a mixed liquid of water and a water-soluble organic solvent. The water is preferably deionized water rather than general water, which contains a variety of ions, and the water-soluble organic solvent is preferably a solvent having low volatility from the viewpoint of suppressing clogging. Examples include polyhydric alcohols such as ethylene glycol, diethylene glycol, triethylene glycol, polyethylene glycol, propylene glycol, 1,3-propanediol, 1,5-pentanediol, 1,2-hexanediol, 1,2,6-hexanetriol and glycerol, glycol ethers such as ethylene glycol monomethyl ether, ethylene glycol monobutyl ether, diethylene glycol monomethyl ether, diethylene glycol monobutyl ether, triethylene glycol monomethyl ether, triethylene glycol monobutyl ether, propylene glycol monomethyl ether, propylene glycol monobutyl ether and dipropylene glycol monomethyl ether, nitrogen-containing solvents such as formamide, dimethylformamide, diethanolamine, triethanolamine, 1,3-dimethyl-2-imidazolidinone, 2-pyrrolidone and N-methyl-2-pyrrolidone, and sulfur-containing solvents such as thiodiglycol and dimethylsulfoxide. However, there is no limitation to these compounds in the present invention, and it is also acceptable to include a plurality of types of water-soluble organic solvent. Moreover, these solvents may be used singly, or two or more types may be used together. It is suitable for an ink jet ink for the content of the water-soluble organic solvent(s) to be in a range of 3.0 to 50.0 wt % relative to the total weight of the ink. By making the content be at least 3.0 wt %, clogging at the nozzle tips becomes not prone to occur, and by making the content be not more than 50.0 wt %, the occurrence of phenomena such as dropping of the drying ability of recorded images and smudging of images leading to a drop in printing quality can be prevented.

Furthermore, to prevent ink clogging, a wetting agent that is a solid at normal temperatures and has a moisture-absorbing ability such as urea, trimethylol ethane or trimethylol propane is also effective; the amount added thereof is preferably 2 to 20 wt %, more preferably 5 to 10 wt %, relative to the total weight of the ink.

Moreover, dropping of the printing quality, smudging and the like are problems, but by including a glycol ether or the like or an acetylenic glycol type nonionic surfactant, these problems can be resolved, and vivid images with no smudging can be obtained. More preferably, by using a glycol ether or the like and an acetylenic glycol type nonionic surfactant together, color images with yet better vividness and printing quality can be obtained.

A water-soluble organic solvent as mentioned earlier is preferable as the glycol ether, with particularly preferable examples being diethylene glycol monobutyl ether, triethylene glycol monobutyl ether, propylene glycol monobutyl ether and dipropylene glycol monobutyl ether. The amount added may be the same as that of the water-soluble organic solvent mentioned earlier, but is more preferably selected from a range of 3.0 to 20.0 wt %. If it is less than 3.0 wt % then effects will hardly be obtained, and if it is more than 20.0 wt % then smudging will actually become greater, the image as a whole will become blurred, and the printing quality will be reduced; it is thus preferable to use the glycol ether in the mentioned range.

Examples of the acetylenic glycol type nonionic surfactant include Olfine E1010, Olfine STG and Olfine 104E (all made by Nissin Chemical Industry Co., Ltd.). The amount added thereof is preferably in a range of 0.01 to 3.0 wt % relative to the total weight of the ink.

The water content depends on the type and composition of the above-mentioned solvent component and the desired properties of the recording liquid and can be determined from a broad range, being in a range from 10.0 to 70.0 wt % of the total weight of the ink.

In addition to the above-mentioned components, as necessary additives can be mixed into the ink of the present invention for giving the ink desired properties, for example viscosity regulators such as sodium alginate and polyvinyl alcohol, pH regulating agents such as alkali metal hydroxides such as potassium hydroxide, sodium hydroxide and lithium hydroxide and pH buffering agents such as ammonium phosphate, preservatives, corrosion-preventing agents, antioxidants, fungicides, and chelating agents.

Furthermore, to promote drying of the ink after image formation, it is preferable for the ink compositions of the present invention to contain lower alcohols such as ethanol, 1-propanol and 2-propanol, anionic surfactants such as fatty acid salts and alkyl sulfate ester salts, and nonionic surfactants such as acetylenic glycols, polyoxyethylene alkyl ethers and polyoxyethylene fatty acid esters. The lower alcohol content is preferably in a range of 2 to 10 wt %, more preferably 2 to 6 wt %, relative to the total amount of the ink, and the surfactant content is preferably in a range of 0.01 to 2 wt % relative to the total amount of the ink. If these contents are less than this, then the effect of promoting drying will not be sufficient, whereas if they are greater than this, then smudging may occur, there will be adverse effects on the state of discharge (or flying) of the ink with the ink jet recording method, and the image quality will drop.

Furthermore, water-soluble polymers or water-soluble resins, antifoaming agents, pH regulators, fungicides and the like may be included in the ink of the present invention as necessary.

According to the ink jet recording method of the present invention, color reproducibility is excellent for each of magenta, yellow and cyan, and in addition good light-fastness can be obtained both for single colors and for secondary colors and tertiary colors.

Moreover, the inkjet recording method of the present invention is a method of carrying out recording using the ink described above, but any conventional publicly-known method can be used as the head discharge method; in particular, in the case of a method in which droplets are discharged by using the vibrations of piezoelectric elements or a method using thermal energy, an excellent ink jet recording method can be carried out.

Regarding the manufacture of the ink described above, manufacturing can be carried out following normal methods. An example is a method in which the ink is prepared by thoroughly mixing and dissolving the various components, carrying out pressure filtration using a membrane filter of pore size 0.8 μm, and then carrying out deaeration treatment using a vacuum pump.

Then, the ink and ink set according to the present invention can be used with various recording methods. Examples of recording methods using the ink and ink set are an ink jet recording method, a recording method using a writing instrument such as a pen, and other types of printing method using a recorder, a pen plotter or the like. In particular, the ink and ink set according to the present invention can be used especially suitably with an ink jet recording method in which recording is carried out by discharging a recording liquid from minute nozzles provided in a recording head.

Any conventional publicly-known method can be used as the ink jet recording method; in particular, in the case of a method in which droplets are discharged using the vibrations of piezoelectric elements or a method using thermal energy, excellent image recording can be carried out.

EXAMPLES

Following is a more specific description of the present invention, citing examples, but the present invention is not limited thereto.

Examples A

Tables 1 to 3

The ink sets of the present Examples and Comparative Examples were prepared by mixing and dissolving in the mix proportions shown in Tables 1 and 2 and then carrying out pressure filtration using a membrane filter of pore size 1 μm. Note that regarding the various components of the inks shown in the tables, the wt % of each component relative to the total amount of the ink is shown, with the remainder being water. Moreover, for the ink sets of Examples 1 to 4, the components of each ink include a dye specified in the present invention, whereas for the ink sets of Comparative Examples 1 to 4, the components of each ink include a dye different to the dye specified in the present invention, or else a combination of the dye specified in the present invention and another dye is used.

TABLE 1

|  | Example 1 | | | Example 2 | | | Example 3 | | | Example 4 | | |
| --- | --- | --- | --- | --- | --- | --- | --- | --- | --- | --- | --- | --- |
|  | M | Y | C | M | Y | C | M | Y | C | M | Y | C |
| M-1 | 3.5 | | | | | | | | | | | |
| M-3 | | | | 1 | | | | | | | | |
| M-5 | | | | | | | 2.5 | | | 2 | | |
| M-7 | | | | | | | | | | 2 | | |
| C.I. Direct Yellow 86 | | 0.75 | | | 1 | | | | | | 1.5 | |
| C.I. Direct Yellow 132 | | 2 | | | | | | 2 | | | 1.5 | |
| C.I. Direct Yellow 173 | | | | | 1 | | | 0.75 | | | | |
| C.I. Direct Blue 86 | | | | | | 2 | | | | | | 3 |
| C.I. Direct Blue 199 | | | 3.5 | | | | | | 4 | | | |
| TEGmBE | | | | | | | 10 | 10 | 10 | 12 | 12 | 12 |
| DEGmBE | 10 | 10 | 10 | | | | | | | | | |
| DPGmBE | | | | 8 | 8 | 8 | | | | | | |
| TEG | 10 | 10 | 10 | | | | 10 | 10 | 10 | | | |
| DEG | | | | 5 | 5 | 5 | | | | 5 | 5 | 5 |
| GL | 10 | 10 | 10 | 10 | 10 | 10 | 10 | 10 | 10 | 10 | 10 | 10 |
| Olfine E1010 | 1.0 | 1.0 | 1.0 | | | | 1.0 | 1.0 | 1.0 | | | |
| Olfine E104 | | | | 1.0 | 1.0 | 1.0 | | | | | | |
| Olfine STG | | | | | | | | | | 0.5 | 0.5 | 0.5 |
| TEA | 1.0 | 1.0 | 1.0 | 0.5 | 0.5 | 0.5 | 1.0 | 1.0 | 1.0 | 0.5 | 0.5 | 0.5 |
| EDTA | 0.01 | 0.01 | 0.01 | 0.01 | 0.01 | 0.01 | 0.01 | 0.01 | 0.01 | 0.01 | 0.01 | 0.01 |
| PUROKISERU XL-2 | 0.3 | 0.3 | 0.3 | 0.3 | 0.3 | 0.3 | 0.3 | 0.3 | 0.3 | 0.3 | 0.3 | 0.3 |

TABLE 2

|  | Comparative Example 1 | | | Comparative Example 2 | | | Comparative Example 3 | | | Comparative Example 4 | | |
| --- | --- | --- | --- | --- | --- | --- | --- | --- | --- | --- | --- | --- |
|  | M | Y | C | M | Y | C | M | Y | C | M | Y | C |
| M-4 | | | | | | | | | | | | |
| M-6 | | | | | | | | | | | | |
| M-8 | | | | | | | | | | | | |
| M-10 | | | | | | | | | | 1.5 | | |
| C.I. Acid Red 52 | 2.5 | | | | | | 2 | | | | | |
| C.I. Direct Red 227 | | | | 1.2 | | | 2 | | | 1.5 | | |
| C.I. Direct Yellow 86 | | | | | | | | 2.5 | | | 0.5 | |
| C.I. Direct Yellow 132 | | | | | 1.5 | | | 2.5 | | | | |
| C.I. Direct Yellow 173 | | | | | | | | | | | | |
| C.I. Acid Yellow 32 | | 2 | | | | | | | | | 2 | |
| C.I. Direct Blue 86 | | | | | | 2 | | | | | | |
| C.I. Direct Blue 199 | | | | | | | | | 3 | | | |
| C.I. Acid Blue 9 | | | 4.0 | | | | | | | | | 3.5 |
| TEGmBE | 10 | 10 | 10 | | | | | | | 12 | 12 | 12 |
| DEGmBE | | | | 10 | 10 | 10 | | | | | | |
| DPGmBE | | | | | | | 10 | 10 | 10 | | | |
| TEG | | | | 10 | 10 | 10 | | | | | | |
| DEG | 10 | 10 | 10 | | | | 10 | 10 | 10 | | | |
| GL | 10 | 10 | 10 | 10 | 10 | 10 | 10 | 10 | 10 | 8 | 8 | 8 |
| Olfine E1010 | 1.0 | 1.0 | 1.0 | | | | 1.0 | 1.0 | 1.0 | | | |
| Olfine E104 | | | | 1.0 | 1.0 | 1.0 | | | | | | |
| Olfine STG | | | | | | | | | | 0.5 | 0.5 | 0.5 |
| TEA | 1.0 | 1.0 | 1.0 | 0.5 | 0.5 | 0.5 | 1.0 | 1.0 | 1.0 | 0.5 | 0.5 | 0.5 |
| EDTA | 0.01 | 0.01 | 0.01 | 0.01 | 0.01 | 0.01 | 0.01 | 0.01 | 0.01 | 0.01 | 0.01 | 0.01 |
| PUROKISERU XL-2 | 0.3 | 0.3 | 0.3 | 0.3 | 0.3 | 0.3 | 0.3 | 0.3 | 0.3 | 0.3 | 0.3 | 0.3 |

The following supplements Tables 1 and 2.

TEGmBE: Triethylene glycol monobutyl ether
DEGmBE: Diethylene glycol monobutyl ether
DPGmBE: Dipropylene glycol monobutyl ether
TEG: Triethylene glycol
DEG: Diethylene glycol
GL: Glycerol
TEA: Triethanolamine
EDTA: Disodium ethylenediamine tetraacetate, a chelating agent Olfine E1010, Olfine 104, Olfine STG: products of Nissin Chemical Industry Co., Ltd., acetylenic glycol type surfactants
PUROKISERU XL-2: product of Avecia, a preservative Using the inks obtained in above-mentioned Examples 1 to 4 and Comparative Examples 1 to 4, printing was carried out using an EM-900C ink jet printer (4-color cartridge) (made by Seiko Epson Corporation). The printing was carried out using four types of recording medium, PM mat paper, super fine special glossy paper, and PM photographic paper, which are all paper especially for ink jet printers (the above are all made by Seiko Epson Corporation), and Xerox 4024 normal paper (made by Xerox Co., USA), and using these samples evaluation was carried out with regard to Tests 1 to 5 indicated below.

Test 1: Light-fastness

For each of the ink sets of the Examples and the Comparative Examples, the magenta, yellow and cyan inks were filled into the respective ink chambers of an ink cartridge (made by Seiko Epson Corporation) for the EM-900C, and solid printing of magenta, yellow, cyan, red, blue, green and composite black was carried out. The printed sample was then irradiated with light for 60 hours using a Ci35A xenon weatherometer (made by Atlas Electronic Devices), the hue ($L^*$,$a^*$,$b^*$) was measured before and after the irradiation with light using a Gretag densitometer (made by Gretag), the color difference $\Delta E^*ab$ was determined from the following equation, and judgement was carried out based on the undermentioned evaluation criteria.

$$\Delta E^*ab=[(\Delta L^*)^2+(\Delta a^*)^2+(\Delta b^*)^2]^{1/2}$$

Evaluation Criteria

A: Color difference $\Delta E^*ab$ not more than 5.
B: Color difference $\Delta E^*ab$ more than 5 but not more than 10.
C: Color difference $\Delta E^*ab$ more than 10 but not more than 20.
D: Color difference $\Delta E^*ab$ more than 20.

Test 2: Bleeding

For each of the ink sets of above-mentioned Examples 1 to 4 and Comparative Examples 1 to 4, for each of the recording media, solid printing of each of the colors was carried out, and evaluation was carried out in accordance with the undermentioned criteria with regard to whether colors blurred or mixed together unevenly at boundaries between one color and another.

Evaluation Criteria

A: No bleeding whatsoever.
B: Parts where colors blurred or mixed together unevenly are slightly present, but no problem in terms of practical usage.
C: Parts where colors blurred or mixed together unevenly are conspicuous, somewhat of a problem in terms of practical usage.
D: Very bad bleeding.

Test 3: Ability to Recover from Nozzle Clogging

The inks of each of the ink sets were filled into a head by repeating cleaning, it was confirmed by printing that ink was discharged from each of the nozzles, and then the head was left for 1 month in a 40° C. environment with the cap off. After this, the printer was switched on, and judgement was carried out based on the undermentioned evaluation criteria from the number of times that it was necessary to carry out the cleaning operation until ink could be discharged from all of the nozzles.

Evaluation Criteria

A: Cleaned once.
B: Cleaned 2 to 3 times.
C: Cleaned 4 times or more.
D: No discharge.

Test 4: Quick-drying Ability

Using each of the ink sets, single-color solid printing for each of the ink compositions, and solid printing combining and overlapping two colors, were carried out. Once a prescribed time had passed after the printing, the paper on which the printing had been carried out and another sheet of paper of the same type were pushed together firmly, and it was observed whether or not ink was transferred between the two sheets. The results were judged based on the undermentioned evaluation criteria.

Evaluation Criteria

A: For all of the print, ink transfer is not observed even if the time after printing is less than 1 second.
B: For all of the print, ink transfer is not observed if the time after printing is at least 1 second but less than 2 seconds.
C: For all of the print, ink transfer is not observed if the time after printing is at least 2 seconds but less than 5 seconds.
D: For all of the print, ink transfer is observed even if 5 seconds or more has passed after printing.

Test 5: Discharge Stability (Prolonged Continuous Recording)

Using each of the inks, continuous printing was carried out for 48 hours under an environment of a temperature of 5° C., 20° C. or 40° C. The time until dot omission or scattering of ink was observed a total of 10 times was measured. The results were judged based on the undermentioned evaluation criteria.

Evaluation Criteria

A: At all temperatures, there was no dot omission, and stable printing was possible.
B: At one of the temperatures, dot omission started to occur as time passed.
C: At one of the temperatures, dot omission occurred right from the start.

The results of the above tests are shown in Table 3.

TABLE 3

|  |  | Ex 1 | Ex 2 | Ex 3 | Ex 4 | CE 1 | CE 2 | CE 3 | CE 4 |
|---|---|---|---|---|---|---|---|---|---|
| Test 1 | Xerox 4024 | A | A | A | A | C | C | C | B |
|  | PM mat paper | A | A | A | A | C | C | C | B |

TABLE 3-continued

|  |  | Ex 1 | Ex 2 | Ex 3 | Ex 4 | CE 1 | CE 2 | CE 3 | CE 4 |
|---|---|---|---|---|---|---|---|---|---|
|  | Glossy paper | A | A | A | A | C | C | C | B |
|  | PM photographic paper | A | A | A | A | C | C | C | B |
| Test 2 | Xerox 4024 | B | A | A | A | B | B | A | B |
|  | PM mat paper | A | A | A | A | A | A | A | A |
|  | Glossy paper | A | A | A | A | A | A | A | A |
|  | PM photographic paper | A | A | A | A | A | A | A | A |
| Test 3 |  | B | A | A | B | B | A | A | B |
| Test 4 |  | A | A | A | A | A | A | A | A |
| Test 5 |  | A | A | A | A | A | A | A | A |

Ex 1–5 means Example 1–5,
CE 1–5 means Comparative Example 1–5.

Examples B

Tables 4 to 8

Dark magenta inks (M) and light magenta inks (LM) of the Examples and Comparative Examples were manufactured using the previously mentioned ink manufacturing method with compositions shown in Table 4 and Table 5 respectively. Note that regarding the amounts of the various components of the inks shown in the tables, the wt % of each component relative to the total weight of the ink is shown, with the remainder being ion exchange water.

TABLE 4

|  | Example 1M | Example 2M | Example 3M | Example 4M | Example 5M | Comparative Example 1M | Comparative Example 2M | Comparative Example 3M |
|---|---|---|---|---|---|---|---|---|
| Dye | (M-1) 2.2 | (M-4) 2.7 | (M-7) 3.5 | (M-10) 1.0 | (M-1) 1.5 (M-10) 2.5 | C.I. Acid Red 52 2.0 | C.I. Direct Red 227 4.0 | C.I. Reactive Red 180 2.7 |
| Glycerol | 10 | 10 | 5 | 10 | 10 | 10 | 10 | 10 |
| Diethylene glycol |  | 11 | 5 | 5 | 5 | 13 | 13 | 13 |
| Triethylene glycol | 5 |  | 8 |  |  |  |  |  |
| Triethanolamine | 1 | 1 |  |  |  |  |  |  |
| 2-pyrrolidone | 3 |  | 2 | 2 |  |  |  |  |
| 1,2-hexanediol |  |  | 5 |  | 8 |  |  |  |
| Urea | 3 |  |  | 5 |  |  |  |  |
| Diethylene glycol monobutyl ether |  |  | 1 |  |  |  |  |  |
| Triethylene glycol monobutyl ether | 10 | 10 |  |  |  | 10 | 10 | 10 |
| Dipropylene glycol monobutyl ether |  |  |  | 10 |  |  |  |  |
| Olfine STG |  |  | 0.5 |  | 0.5 |  |  |  |
| Olfine E1010 | 1 | 1 |  | 0.2 | 1 | 1 | 1 | 1 |
| Olfine E104 |  |  |  | 0.5 |  |  |  |  |
| EDTA* | 0.02 | 0.02 | 0.02 | 0.02 | 0.02 | 0.02 | 0.02 | 0.02 |
| PUROKISERU XL-2** | 0.3 | 0.3 | 0.3 | 0.3 | 0.3 | 0.3 | 0.3 | 0.3 |
| Benzotriazole*** | 0.01 | 0.01 | 0.01 | 0.01 | 0.1 | 0.01 | 0.01 | 0.01 |
| Potassium hydroxide |  |  | 0.1 |  |  |  |  |  |

EDTA*: Sodium ethylenediamine tetraacetate (metal masking agent)
PUROKISERU XL-2**: Preservative (product of Avecia)
Benzotriazole***: Corrosion-preventing agent

TABLE 5

| | Example 1LM | Example 2LM | Example 3LM | Example 4LM | Example 5LM | Comparative Example 1LM | Comparative Example 2LM | Comparative Example 3LM |
|---|---|---|---|---|---|---|---|---|
| Dye | (LM-1) 1.5 | (LM-4) 2.0 | (LM-6) 3.0 | (LM-9) 0.5 | (LM-2) 2.0 (LM-10) 2.0 | C.I. Acid Red 52 0.5 | C.I. Acid Red 82 2.5 | (M-1) 0.7 |
| Glycerol | 10 | 10 | 5 | 10 | 10 | 10 | 10 | 10 |
| Diethylene glycol | | 13 | 5 | 5 | 5 | 15 | 15 | 15 |
| Triethylene glycol | 10 | | 10 | | | | | |
| Triethanolamine | | 1 | | | | | | 0.5 |
| 2-pyrrolidone | 2 | | | | | | | |
| 1,2-hexanediol | | | 5 | | 5 | | | |
| Urea | | | | 5 | | | | |
| Diethylene glycol monobutyl ether | 10 | | | | | | | |
| Triethylene glycol monobutyl ether | | 10 | | 10 | | 10 | 10 | 10 |
| Dipropylene glycol monobutyl ether | | | 10 | | | | | |
| Olfine STG | 0.5 | | | | 0.5 | | | |
| Olfine E1010 | | 1 | | | 1 | 1 | 1 | 1 |
| Olfine E104 | | | | 0.5 | | | | |
| EDTA* | 0.02 | 0.02 | 0.02 | 0.02 | 0.02 | 0.02 | 0.02 | 0.02 |
| PUROKISERU XL-2** | 0.3 | 0.3 | 0.3 | 0.3 | 0.3 | 0.3 | 0.3 | 0.3 |
| Benzotriazole*** | 0.01 | 0.01 | 0.01 | 0.01 | 0.01 | 0.01 | 0.01 | 0.01 |
| Potassium hydroxide | | 0.1 | | | 0.05 | | | 0.05 |

EDTA*: Sodium ethylenediamine tetraacetate (metal masking agent)
PUROKISERU XL-2**: Preservative (product of Avecia)
Benzotriazole***: Corrosion-preventing agent Next, for the inks obtained, evaluation was carried out with regard to Tests 1 to 4, using the recording media shown below. 1) is so-called normal paper, while 2) to 4) are recording media especially for ink jet printers.

Recording Media

1) Xerox 4024 (Xerox Co., USA)
2) Epson PM mat paper (Seiko Epson Corporation)
3) Epson Photoprint Paper 2 (Seiko Epson Corporation)
4) Epson PM photographic paper (Seiko Epson Corporation)

Moreover, in the evaluation tests, a PM-800C ink jet printer (made by Seiko Epson Corporation) was used.

In the light-fastness tests, evaluation was carried out using a Ci5000 xenon weatherometer (made by Atlas Electronic Devices) as a light-fastness accelerated testing apparatus.

Test 1: Light-fastness—1

For each of the inks of the Examples and the Comparative Examples, single-color solid printing (printing of completely filled-in blocks) was carried out on the recording media 1) to 4). 100-hour light-fastness tests were then carried out on the printed samples using a Ci5000 xenon weatherometer (made by Atlas Electronic Devices), the color difference $\Delta E^*ab$ between before and after the test was determined from the following equation (i), and judgement was carried out using the undermentioned criteria.

$$\Delta E^*ab = [(\Delta L^*)^2 + (\Delta a^*)^2 + (\Delta b^*)^2]^{1/2} \quad (i)$$

Judgement Criteria

A: Color difference $\Delta E^*ab$ not more than 5.
B: Color difference $\Delta E^*ab$ more than 5 but not more than 10.
C: Color difference $\Delta E^*ab$ more than 10 but not more than 20.
D: Color difference $\Delta E^*ab$ more than 20.

Test 2: Ability to Recover from Nozzle Clogging

The inks of the Examples and the Comparative Examples were filled into a PM-800C print head, the print head was left for 1 month in a 40° C. environment with the cap off, and then the ability to recover from clogging was judged using the undermentioned criteria from the number of times that it was necessary to carry out the cleaning operation until normal discharge could be carried out from all of the nozzles.

Evaluation Criteria

A: Recovers by cleaning no more than 2 times.
B: Recovers by cleaning 3 to 5 times.
C: Recovers by cleaning 6 or more times.
D: Does not recover.

The results of Tests 1 and 2 are shown in Table 6.

TABLE 6

|  |  | Recording medium |  |  |  |  |
|---|---|---|---|---|---|---|
|  |  | Test 1: Light-fastness - 1 |  |  |  |  |
|  | Ink | 1) | 2) | 3) | 4) | Test 2 |
| Examples | 1M | A | A | A | A | A |
|  | 2M | A | A | A | A | A |
|  | 3M | A | A | A | A | B |
|  | 4M | A | A | A | A | A |
|  | 5M | A | A | A | A | C |
| Comparative | 1M | D | D | D | D | A |
| Examples | 2M | C | D | C | B | C |
|  | 3M | C | C | B | B | B |
| Examples | 1LM | B | B | B | A | A |
|  | 2LM | A | A | A | A | A |
|  | 3LM | A | A | A | A | A |
|  | 4LM | B | B | C | B | A |
|  | 5LM | A | A | A | A | C |
| Comparative | 1LM | D | D | D | D | A |
| Examples | 2LM | B | C | C | C | D |
|  | 3LM | A | A | A | A | A |

Test 3: Light-fastness—2

The dark and light magenta inks of the Examples and Comparative Examples were filled in the combinations shown in Table 7 into the dark magenta ink chamber and light magenta ink chamber of a PM-800C ink cartridge (model number IC5CL05, made by Seiko Epson Corporation), and red, blue and composite black 70% density solid printing was carried out on the recording media 1) to 4).

The printing method was adjusted such that the 70% density red was constituted from the dark magenta, light magenta and yellow inks, the 70% density blue was constituted from the dark magenta, light magenta, dark cyan and light cyan inks, and the 70% density composite black was constituted from the dark magenta, light magenta, dark cyan, light cyan, yellow and black inks.

Note that for the yellow ink, the dark cyan ink, the light cyan ink and the black ink, the original inks of a PM-770C ink cartridge were used.

TABLE 7

|  | Dark magenta ink | Light magenta ink |
|---|---|---|
| Example 1 | Example 1M | Example 1LM |
| Example 2 | Example 2M | Example 2LM |
| Example 3 | Example 3M | Example 3LM |
| Example 4 | Example 4M | Example 4LM |
| Example 5 | Example 5M | Example 5LM |
| Comparative Example 1 | Comparative Example 1M | Comparative Example 1LM |
| Comparative Example 2 | Comparative Example 2M | Example 1LM |
| Comparative Example 3 | Comparative Example 3M | Example 1LM |
| Comparative Example 4 | Comparative Example 3M | Comparative Example 3LM |
| Comparative Example 5 | Example 1M | Comparative Example 2LM |
| Comparative Example 6 | Example 1M | Comparative Example 3LM |

100-hour light-fastness tests were then carried out on the printed samples using a Ci5000 xenon weatherometer (made by Atlas Electronic Devices), $\Delta E^*ab$ between before and after the test was determined from equation (i) as in Test 1, and judgement was carried out using the undermentioned criteria.

Judgement Criteria

A: Color difference $\Delta E^*ab$ not more than 5.
B: Color difference $\Delta E^*ab$ more than 5 but not more than 10.
C: Color difference $\Delta E^*ab$ more than 10 but not more than 20.
D: Color difference $\Delta E^*ab$ more than 20.

Test 4: Bleeding

For the compositions shown in Table 7, for the recording media 1) to 4), solid printing of each of the colors was carried out, and evaluation was carried out in accordance with the undermentioned criteria with regard to whether colors blurred or mixed together unevenly at boundaries between one color and another.

Judgement Criteria

A: No bleeding whatsoever.
B: Parts where colors blurred or mixed together unevenly are slightly present, but no problem in terms of practical usage.
C: Parts where colors blurred or mixed together unevenly are conspicuous, somewhat of a problem in terms of practical usage.
D: Very bad bleeding.

The evaluation results for Tests 3 and 4 are shown in Table 8.

TABLE 8

| Ink set | Recording medium | Test 3: Light-fastness-2 |  |  |  | Test 4 |  |  |  |
|---|---|---|---|---|---|---|---|---|---|
|  |  | 1) | 2) | 3) | 4) | 1) | 2) | 3) | 4) |
| Example 1 | Red | A | A | A | A | A | A | A | A |
|  | Blue | A | A | A | A |  |  |  |  |
|  | Black | A | A | A | A |  |  |  |  |
| Example 2 | Red | A | A | A | A | A | A | A | A |
|  | Blue | A | A | A | A |  |  |  |  |
|  | Black | A | A | A | A |  |  |  |  |
| Example 3 | Red | A | A | A | A | B | A | A | B |
|  | Blue | A | A | A | A |  |  |  |  |
|  | Black | A | A | A | A |  |  |  |  |
| Example 4 | Red | A | A | A | A | A | A | A | A |
|  | Blue | A | A | A | A |  |  |  |  |
|  | Black | A | A | A | A |  |  |  |  |
| Example 5 | Red | A | A | A | A | B | A | A | C |
|  | Blue | A | A | A | A |  |  |  |  |
|  | Black | A | A | A | A |  |  |  |  |
| Comparative Example 1 | Red | D | D | D | D | A | A | A | A |
|  | Blue | A | B | B | B |  |  |  |  |
|  | Black | D | D | D | D |  |  |  |  |
| Comparative Example 2 | Red | C | D | D | B | A | A | A | A |
|  | Blue | C | C | C | C |  |  |  |  |
|  | Black | B | B | B | B |  |  |  |  |
| Comparative Example 3 | Red | B | D | D | B | A | A | A | A |
|  | Blue | B | C | B | A |  |  |  |  |
|  | Black | B | C | C | A |  |  |  |  |
| Comparative Example 4 | Red | B | D | D | B | A | A | A | A |
|  | Blue | C | C | C | D |  |  |  |  |
|  | Black | C | C | C | D |  |  |  |  |
| Comparative Example 5 | Red | A | A | A | A | A | A | A | A |
|  | Blue | B | C | B | C |  |  |  |  |
|  | Black | B | C | B | C |  |  |  |  |

TABLE 8-continued

| Ink set | Recording medium | Test 3: Light-fastness-2 1) | 2) | 3) | 4) | Test 4 1) | 2) | 3) | 4) |
|---|---|---|---|---|---|---|---|---|---|
| Comparative Example 6 | Red | A | A | A | A | A | A | A | A |
| | Blue | B | C | B | D | | | | |
| | Black | C | C | C | C | | | | |

Examples C

Tables 9 to 12

The ink sets of the present Examples and Comparative Examples were prepared by mixing and dissolving in the mix proportions shown in Tables 9 to 11 and then carrying out pressure filtration using a membrane filter of pore size 1 μm. Note that regarding the various components of the inks shown in the tables, the wt % of each component relative to the total amount of the ink is shown, with the remainder being water. Moreover, for the ink sets of Examples 1 to 5, the components of each ink include a dye specified in the present invention, whereas for the ink sets of Comparative Examples 1 and 2, the components of each ink include only a dye of a type different to the dye specified in the present invention. The ink sets of Comparative Examples 3 to 5 are ink sets comprising magenta ink, yellow ink and cyan ink that use both a dye specified in the present invention and a dye of a different type to this.

TABLE 9

| | Example 1 | | | | | Example 2 | | | | |
|---|---|---|---|---|---|---|---|---|---|---|
| | M | LM | Y | C | LC | M | LM | Y | C | LC |
| M-1 | 2 | | | | | | | | | |
| M-3 | | | | | | 1.2 | | | | |
| M-7 | | | | | | | | | | |
| LM-5 | | 1 | | | | | | | | |
| LM-10 | | | | | | | 0.8 | | | |
| LM-12 | | | | | | | | | | |
| C.I. Direct Yellow 86 | | | 2 | | | | | 1 | | |
| C.I. Direct Yellow 132 | | | 0.75 | | | | | | | |
| C.I. Direct Yellow 173 | | | | | | | | 2.5 | | |
| C.I. Direct Blue 86 | | | | 2.5 | 2 | | | | | |
| C.I. Direct Blue 199 | | | | | | | | | 3 | 0.8 |
| TEGmBE | 10 | 10 | 10 | 10 | 10 | | | | | |
| DEGmBE | | | | | | 10 | 10 | 10 | 10 | 10 |
| DPGmBE | | | | | | | | | | |
| TEG | | | | | | 8 | 8 | 8 | 8 | 8 |
| DEG | 10 | 10 | 10 | 10 | 10 | | | | | |
| GL | 10 | 10 | 10 | 10 | 10 | 10 | 10 | 10 | 10 | 10 |
| Olfine E1010 | 1.0 | 1.0 | 1.0 | 1.0 | 1.0 | | | | | |
| Olfine E104 | | | | | | 1.0 | 1.0 | 1.0 | 1.0 | 1.0 |
| Olfine STG | | | | | | | | | | |
| TEA | 1.0 | 1.0 | 1.0 | 1.0 | 1.0 | 0.5 | 0.5 | 0.5 | 0.5 | 0.5 |
| EDTA | 0.01 | 0.01 | 0.01 | 0.01 | 0.01 | 0.01 | 0.01 | 0.01 | 0.01 | 0.01 |
| PUROKISERU XL-2 | 0.3 | 0.3 | 0.3 | 0.3 | 0.3 | 0.3 | 0.3 | 0.3 | 0.3 | 0.3 |

| | Example 3 | | | | | Example 4 | | | | |
|---|---|---|---|---|---|---|---|---|---|---|
| | M | LM | Y | C | LC | M | LM | Y | C | LC |
| M-1 | | | | | | | | | | |
| M-3 | 3.5 | | | | | | | | | |
| M-7 | | | | | | 4 | | | | |
| LM-5 | | | | | | | | | | |
| LM-10 | | 2.5 | | | | | | | | |
| LM-12 | | | | | | | 3 | | | |
| C.I. Direct Yellow 86 | | | 0.5 | | | | | 3 | | |
| C.I. Direct Yellow 132 | | | | | | | | | | |
| C.I. Direct Yellow 173 | | | 1.5 | | | | | 1 | | |
| C.I. Direct Blue 86 | | | | 1.5 | 1.5 | | | | | |
| C.I. Direct Blue 199 | | | | | | | | | 4 | 3 |
| TEGmBE | | | | | | | | | | |
| DEGmBE | | | | | | 10 | 10 | 10 | 10 | 10 |
| DPGmBE | 8 | 8 | 8 | 8 | 8 | | | | | |
| TEG | | | | | | 8 | 8 | 8 | 8 | 8 |
| DEG | 8 | 8 | 8 | 8 | 8 | | | | | |
| GL | 10 | 10 | 10 | 10 | 10 | 10 | 10 | 10 | 10 | 10 |
| Olfine E1010 | | | | | | | | | | |
| Olfine E104 | 1 | 1 | 1 | 1 | 1 | 1.0 | 1.0 | 1.0 | 1.0 | 1.0 |
| Olfine STG | | | | | | | | | | |
| TEA | 1.0 | 1.0 | 1.0 | 1.0 | 1.0 | 0.5 | 0.5 | 0.5 | 0.5 | 0.5 |
| EDTA | 0.01 | 0.01 | 0.01 | 0.01 | 0.01 | 0.01 | 0.01 | 0.01 | 0.01 | 0.01 |
| PUROKISERU XL-2 | 0.3 | 0.3 | 0.3 | 0.3 | 0.3 | 0.3 | 0.3 | 0.3 | 0.3 | 0.3 |

TABLE 10

|  | Example 5 | | | | | Comparative Example 1 | | | | | Comparative Example 2 | | | | |
| --- | --- | --- | --- | --- | --- | --- | --- | --- | --- | --- | --- | --- | --- | --- | --- |
|  | M | LM | Y | C | LC | M | LM | Y | C | LC | M | LM | Y | C | LC |
| M-4 | 2 | | | | | | | | | | | | | | |
| M-10 | 2 | | | | | | | | | | | | | | |
| LM-2 | | 1.5 | | | | | | | | | | | | | |
| LM-7 | | 1.5 | | | | | | | | | | | | | |
| C.I. Direct Red 227 | | | | | | 2 | 1 | | | | | | | | |
| C.I. Acid Red 52 | | | | | | | | | | | | | | | |
| C.I. Acid Red 249 | | | | | | | | | | | 3.5 | 0.8 | | | |
| C.I. Direct Yellow 86 | | | 2 | | | | | | | | | | | | |
| C.I. Direct Yellow 132 | | | | | | | | | | | | | | | |
| C.I. Direct Yellow 173 | | | 2 | | | | | | | | | | | | |
| C.I. Direct Yellow 142 | | | | | | | | 2.5 | | | | | | | |
| C.I. Acid Yellow 32 | | | | | | | | | | | | | 3 | | |
| C.I. Direct Blue 86 | | | | | | | | | | | | | | | |
| C.I. Direct Blue 199 | | | | 2.5 | 2.5 | | | | | | | | | | |
| C.I. Acid Blue 9 | | | | | | | | | 4 | 1.5 | | | | 3 | 0.8 |
| TEGmBE | 10 | 10 | 10 | 10 | 10 | 10 | 10 | 10 | 10 | 10 | | | | | |
| DEGmBE | | | | | | | | | | | 10 | 10 | 10 | 10 | 10 |
| DPGmBE | | | | | | | | | | | | | | | |
| TEG | | | | | | | | | | | 8 | 8 | 8 | 8 | 8 |
| DEG | 10 | 10 | 10 | 10 | 10 | 10 | 10 | 10 | 10 | 10 | | | | | |
| GL | 10 | 10 | 10 | 10 | 10 | 10 | 10 | 10 | 10 | 10 | 10 | 10 | 10 | 10 | 10 |
| Olfine E1010 | 0.3 | 0.3 | 0.3 | 0.3 | 0.3 | 1.0 | 1.0 | 1.0 | 1.0 | 1.0 | | | | | |
| Olfine E104 | | | | | | | | | | | 1.0 | 1.0 | 1.0 | 1.0 | 1.0 |
| Olfine STG | | | | | | | | | | | | | | | |
| TEA | 1 | 1 | 1 | 1 | 1 | 1.0 | 1.0 | 1.0 | 1.0 | 1.0 | 0.5 | 0.5 | 0.5 | 0.5 | 0.5 |
| EDTA | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 |
| PUROKISERU XL-2 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |

TABLE 11

|  | Comparative Example 3 | | | | | Comparative Example 4 | | | | | Comparative Example 5 | | | | |
| --- | --- | --- | --- | --- | --- | --- | --- | --- | --- | --- | --- | --- | --- | --- | --- |
|  | M | LM | Y | C | LC | M | LM | Y | C | LC | M | LM | Y | C | LC |
| M-2 | 2 | | | | | | | | | | 2 | | | | |
| M-6 | | | | | | | | | | | | | | | |
| LM-3 | | | | | | | | | | | | 0.8 | | | |
| LM-8 | | | | | | | 2 | | | | | | | | |
| C.I. Direct Red 227 | | | | | | 3 | | | | | | | | | |
| C.I. Acid Red 52 | | 1.5 | | | | | | | | | | | | | |
| C.I. Acid Red 249 | | | | | | | | | | | 2 | 0.8 | | | |
| C.I. Direct Yellow 86 | | | 2 | | | | | | | | | | | | |
| C.I. Direct Yellow 132 | | | | | | | | 1 | | | | | | | |
| C.I. Direct Yellow 173 | | | | | | | | | | | | | 1.2 | | |
| C.I. Direct Yellow 142 | | | 1.5 | | | | | | | | | | | | |
| C.I. Acid Yellow 32 | | | | | | | | 2.5 | | | | | 1 | | |
| C.I. Direct Blue 86 | | | | 2 | | | | | | | | | | | |
| C.I. Direct Blue 199 | | | | | | | | | | 1.5 | | | | 2 | 0.5 |
| C.I. Acid Blue 9 | | | | | 2 | | | | 4 | | | | | 1 | 0.5 |
| TEGmBE | | | | | | | | | | | 10 | 10 | 10 | 10 | 10 |
| DEGmBE | | | | | | 10 | 10 | 10 | 10 | 10 | | | | | |
| DPGmBE | 8 | 8 | 8 | 8 | 8 | | | | | | | | | | |
| TEG | | | | | | 8 | 8 | 8 | 8 | 8 | | | | | |
| DEG | 8 | 8 | 8 | 8 | 8 | | | | | | 10 | 10 | 10 | 10 | 10 |
| GL | 10 | 10 | 10 | 10 | 10 | 10 | 10 | 10 | 10 | 10 | 10 | 10 | 10 | 10 | 10 |
| Olfine E1010 | | | | | | | | | | | 0.3 | 0.3 | 0.3 | 0.3 | 0.3 |
| Olfine E104 | 1 | 1 | 1 | 1 | 1 | 1.0 | 1.0 | 1.0 | 1.0 | 1.0 | | | | | |
| Olfine STG | | | | | | | | | | | | | | | |
| TEA | 1.0 | 1.0 | 1.0 | 1.0 | 1.0 | 0.5 | 0.5 | 0.5 | 0.5 | 0.5 | 1 | 1 | 1 | 1 | 1 |
| EDTA | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 |
| PUROKISERU XL-2 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |

The following supplements Tables 9 to 11.

TEGmBE: Triethylene glycol monobutyl ether
DEGmBE: Diethylene glycol monobutyl ether
DPGmBE: Dipropylene glycol monobutyl ether
TEG: Triethylene glycol
DEG: Diethylene glycol
GL: Glycerol
TEA: Triethanolamine
EDTA: Disodium ethylenediamine tetraacetate, a chelating agent Olfine E1010, Olfine E104, Olfine STG: products of Nissin Chemical Industry Co., Ltd., acetylenic glycol type surfactants
PUROKISERU XL-2: product of Avecia, a preservative Using the inks obtained in above-mentioned Examples 1 to 5 and Comparative Examples 1 to 5, printing was carried out using a PM-800C ink jet printer (6-color cartridge) (made by Seiko Epson Corporation). The printing was carried out using four types of recording medium, PM mat paper, super fine special glossy paper, and PM photographic paper, which are all paper especially for ink jet printers (the above are all made by Seiko Epson Corporation), and Xerox 4024 normal paper (made by Xerox Co., USA), and using these samples evaluation was carried out with regard to Tests 1 to 5 indicated below.

Test 1: Light-fastness

For each of the ink sets of the Examples and the Comparative Examples, the dark and light magenta, yellow, and dark and light cyan inks were filled into the respective ink chambers of an ink cartridge (made by Seiko Epson Corporation) for the PM-800C, and solid printing of magenta, yellow, cyan, red, blue, green and composite black was carried out. The printing method was adjusted such that the red was constituted from the dark magenta, light magenta and yellow inks, the blue was constituted from the dark magenta, light magenta, dark cyan and light cyan inks, the green was constituted from the yellow, dark cyan and light cyan inks, and the composite black was constituted from the dark magenta, light magenta, yellow, dark cyan, light cyan and black inks. The printed sample was then irradiated with light for 60 hours using a. Ci35A xenon weatherometer (made by Atlas Electronic Devices), the hue (L*,a*,b*) was measured before and after the irradiation with light using a Gretag densitometer (made by Gretag), the color difference ΔE*ab was determined from the following equation, and judgement was carried out based on the undermentioned evaluation criteria.

$$\Delta E^*ab=[(\Delta L^*)^2+(\Delta a^*)^2+(\Delta b^*)^2]^{1/2}$$

Evaluation Criteria

A: Color difference ΔE*ab not more than 5.
B: Color difference ΔE*ab more than 5 but not more than 10.
C: Color difference ΔE*ab more than 10 but not more than 20.
D: Color difference ΔE*ab more than 20.

Test 2: Bleeding

For each of the ink sets of above-mentioned Examples 1 to 5 and Comparative Examples 1 to 5, for each of the recording media, solid printing of each of the colors was carried out, and evaluation was carried out in accordance with the undermentioned criteria with regard to whether colors blurred or mixed together unevenly at boundaries between one color and another.

Evaluation Criteria

A: No bleeding whatsoever.
B: Parts where colors blurred or mixed together unevenly are slightly present, but no problem in terms of practical usage.
C: Parts where colors blurred or mixed together unevenly are conspicuous, somewhat of a problem in terms of practical usage.
D: Very bad bleeding.

Test 3: Ability to Recover from Nozzle Clogging

The inks of each of the ink sets were filled into a head by repeating cleaning, it was confirmed by printing that ink was discharged from each of the nozzles, and then the head was left for 1 month in a 40° C. environment with the cap off. After this, the printer was switched on, and judgement was carried out based on the undermentioned evaluation criteria from the number of times that it was necessary to carry out the cleaning operation until ink could be discharged from all of the nozzles.

Evaluation Criteria

A: Cleaned once.
B: Cleaned 2 to 3 times.
C: Cleaned 4 times or more.
D: No discharge.

Test 4: Quick-drying Ability

Using each of the ink sets, single-color solid printing for each of the ink compositions, and solid printing combining two colors, were carried out. Once a prescribed time had passed after the printing, the recording paper on which the printing had been carried out and another sheet of paper of the same type were pushed together firmly, and it was observed whether ink was transferred between the two sheets. The results were judged based on the undermentioned evaluation criteria.

Evaluation Criteria

A: For all of the print, ink transfer is not observed even if the time after printing is less than 1 second.
B: For all of the print, ink transfer is not observed if the time after printing is at least 1 second but less than 2 seconds.
C: For all of the print, ink transfer is not observed if the time after printing is at least 2 seconds but less than 5 seconds.
D: For all of the print, ink transfer is observed even if 5 seconds or more has passed after printing.

Test 5: Discharge Stability (Prolonged Continuous Recording)

Using each of the inks, continuous printing was carried out for 48 hours under an environment of a temperature of 5° C., 20° C. or 40° C. The time until dot omission or scattering of ink was observed a total of 10 times was measured. The results were judged based on the undermentioned evaluation criteria.

Evaluation Criteria

A: At all temperatures, there was no dot omission, and stable printing was possible.
B: At one of the temperatures, dot omission started to occur as time passed.
C: At one of the temperatures, dot omission occurred right from the start.

The results of the above tests are shown in Table 12.

| | Ex 1 | Ex 2 | Ex 3 | Ex 4 | Ex 5 | CE 1 | CE 2 | CE 3 | CE 4 | CE 5 |
|---|---|---|---|---|---|---|---|---|---|---|
| Test 1 Xerox 4024 | A | A | A | A | A | C | C | B | B | B |
| PM mat paper | A | A | A | A | A | C | C | B | B | B |
| Glossy paper | A | A | A | A | A | C | C | B | B | B |
| PM photographic paper | A | A | A | A | A | C | C | B | B | B |
| Test 2 Xerox 4024 | A | A | A | A | A | B | B | A | A | A |
| PM mat paper | A | A | A | A | A | A | A | A | A | A |
| Glossy paper | A | A | A | A | A | A | A | A | A | A |
| PM photographic paper | A | A | A | A | A | A | A | A | A | A |
| Test 3 | A | A | B | B | B | B | A | A | B | B |
| Test 4 | A | A | A | A | A | A | A | A | A | A |
| Test 5 | A | A | A | A | A | A | A | A | A | A |

TABLE 12

Ex 1–5 means Example 1–5,
CE 1–5 means Comparative Example 1–5.

INDUSTRIAL APPLICABILITY

According to the present invention, in the case of an ink jet recording method, an ink set and ink jet recording method can be provided according to which light-fastness is excellent, and moreover color reproducibility, clogging properties and other properties are good.

Moreover, according to the present invention, an ink set can be provided according to which reliability with regard to clogging and so on is high, vividness and light-fastness are obtained, and color images can be obtained that have excellent vividness and light-fastness even in mixed color parts were mixing is carried out with ink of another hue.

Furthermore, according to the ink jet recording method using the ink of the present invention, in the case that image formation is carried out on any of various recording media such as paper and resin film, a vivid image quality can be obtained, and moreover a color image having excellent light-fastness can be provided.

What is claimed is:

1. An ink set comprising inks each of which contains at least a dye, a water-soluble organic solvent and water,
    the ink set comprising a combination of magenta ink that contains a dye having a structure shown in general formula (I) below, yellow ink, and cyan ink:

General formula [I]:

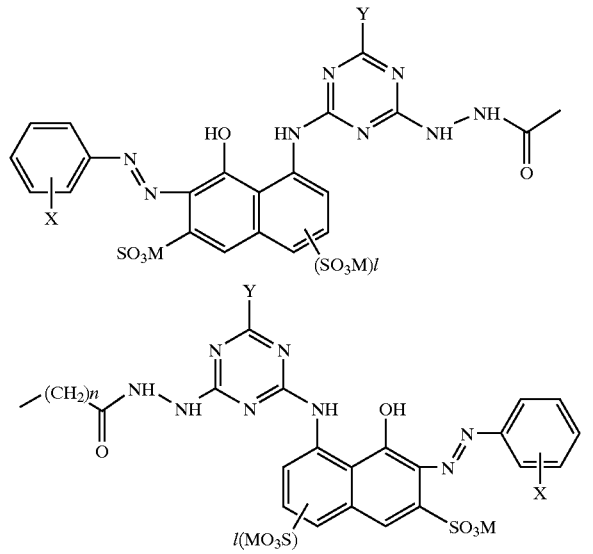

X: COOM or $SO_3M$
Y: —H, —$NH_2$ or —O($CH_2$)$_m$H

M: —H, —Li, —Na, —K, —$NH_4$ or —NH($CH_2OH$)$_3$
n=integer from 2 to 10
m=integer from 1 to 4
l=0 or 1.

2. The ink set according to claim 1, wherein said yellow ink contains at least one dye selected from the group consisting of a dye containing C.I. Direct Yellow 86 and C.I. Direct Yellow 132 in a weight ratio of 1:3 to 3:1, and a dye containing C.I. Direct Yellow 86 and C.I. Direct Yellow 173 in a weight ratio of 1:4 to 4:1, and said cyan ink contains at least one dye selected from the group consisting of C.I. Direct Blue 86 and C.I. Direct Blue 199.

3. The ink set according to claim 2, wherein the dye having a structure shown in said general formula (I) is a water-soluble dye.

4. The ink set according to claim 3, wherein said magenta ink contains 1.0 to 4.0 wt % of the dye shown in said general formula (I) relative to the total amount of said magenta ink, said yellow ink contains 0.3 to 4.0 wt % of at least one dye selected from the group consisting of a dye containing C.I. Direct Yellow 86 and C.I. Direct Yellow 132 in a weight ratio of 1:3 to 3:1, and a dye containing C.I. Direct Yellow 86 and C.I. Direct Yellow 173 in a weight ratio of 1:4 to 4:1, relative to the total amount of said yellow ink, and said cyan ink contains 1.0 to 4.0 wt % of at least one dye selected from the group consisting of C.I. Direct Blue 86 and C.I. Direct Blue 199 relative to the total amount of said cyan ink.

5. The ink set according to claim 2, containing a lower alkyl glycol ether.

6. The ink set according to claim 5, wherein said lower alkyl glycol ether contains at least one compound selected from the group consisting of diethylene glycol monobutyl ether, triethylene glycol monobutyl ether, propylene glycol monobutyl ether, and dipropylene glycol monobutyl ether.

7. The ink set according to claim 5, containing 3.0 to 20.0 wt % of said lower alkyl glycol ether relative to the total weight of the ink.

8. The ink set according to claim 2, containing an acetylenic glycol type nonionic surfactant.

9. The ink set according to claim 8, containing 0.01 to 3.0 wt % of said acetylenic glycol type nonionic surfactant relative to the total weight of the ink.

10. The ink set according to claim 2, containing 3.0 to 50.0 wt % of the water-soluble organic solvent relative to the total weight of the ink.

11. An ink jet recording method of forming a color image using at least magenta ink, yellow ink and cyan ink, the ink jet recording method using the ink set according to claim 2.

12. The ink set according to claim 1, wherein said magenta ink is dark and light magenta ink comprising dark magenta ink containing the dye having a structure shown in said general formula (I), and light magenta ink containing a dye having a structure shown in general formula (II) below:

General formula (II):

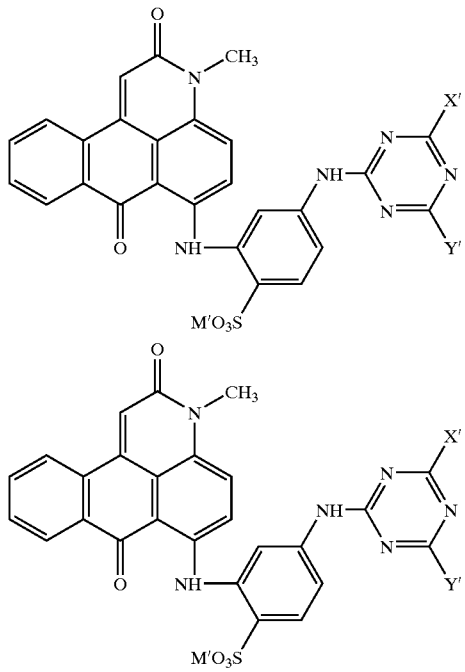

(where X' indicates an anilino group substituted with at least one $SO_3M$;
Y' indicates OH, Cl or a morpholino group; and
M' indicates H, Li, Na, K, ammonium, or an organic amine).

13. The ink set according to claim 12, wherein the magenta dyes shown in said general formula (I) and general formula (II) are water-soluble.

14. The ink set according to claim 12, wherein said dark magenta ink contains 1 to 5 wt % of the dye having a structure shown in said general formula (I) relative to the total weight of said dark magenta ink,
and said light ink set contains 0.5 to 4 wt % of the dye having a structure shown in said general formula (II) relative to the total weight of said light magenta ink.

15. The ink set according to claim 12, containing a lower alkyl glycol ether.

16. The ink set according to claim 15, wherein said lower alkyl glycol ether contains at least one compound selected from the group consisting of diethylene glycol monobutyl ether, triethylene glycol monobutyl ether, propylene glycol monobutyl ether, and dipropylene glycol monobutyl ether.

17. The ink set according to claim 12, containing an acetylenic glycol type nonionic surfactant.

18. An ink jet recording method of carrying out ink jet recording using the ink set according to claim 12.

19. The ink set according to claim 1, wherein said magenta ink is dark and light magenta ink comprising dark magenta ink containing the dye having a structure shown in said general formula (I), and light magenta ink containing a dye having a structure shown in general formula (II) below,
said yellow ink contains at least one dye selected from the group consisting of a dye containing C.I. Direct Yellow 86 and C.I. Direct Yellow 132 in a weight ratio of 1:3 to 3:1, and a dye containing C.I. Direct Yellow 86 and C.I. Direct Yellow 173 in a weight ratio of 1:4 to 4:1, and
said cyan ink is dark and light cyan ink containing at least one dye selected from the group consisting of C.I. Direct Blue 86 and C.I. Direct Blue 199:

General formula (II):

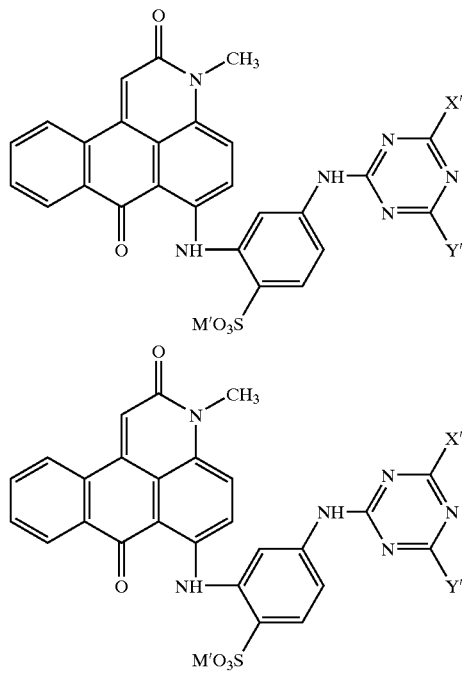

(where X' indicates an anilino group substituted with at least one $SO_3M$;
Y' indicates OH, Cl or a morpholino group; and
M' indicates H, Li, Na, K, ammonium, or an organic amine).

20. The ink set according to claim 19, wherein said dark magenta ink contains 1.0 to 4.0 wt % of the dye shown in said general formula (I) relative to the total weight of said dark magenta ink,
said light magenta ink contains 0.5 to 3.0 wt % of the dye shown in said general formula (II) relative to the total weight of said light magenta ink,
said yellow ink contains 0.3 to 4.0 wt % of at least one dye selected from the group consisting of a dye containing C.I. Direct Yellow 86 and C.I. Direct Yellow 132 in a weight ratio of 1:3 to 3:1, and a dye containing C.I. Direct Yellow 86 and C.I. Direct Yellow 173 in a weight ratio of 1:4 to 4:1, relative to the total weight of said yellow ink, and
said dark and light cyan ink comprises dark cyan ink containing 1.0 to 4.0 wt % of at least one dye selected from the group consisting of C.I. Direct Blue 86 and C.I. Direct Blue 199 relative to the total weight of said dark cyan ink, and light cyan ink containing 0.5 to 3.0 wt % of at least one dye selected from the group consisting of C.I. Direct Blue 86 and C.I. Direct Blue 199 relative to the total weight of said light cyan ink.

21. The ink set according to claim 19, containing a lower alkyl glycol ether.

22. The ink set according to claim 21, wherein said lower alkyl glycol ether contains at least one compound selected from the group consisting of diethylene glycol monobutyl ether, triethylene glycol monobutyl ether, propylene glycol monobutyl ether, and dipropylene glycol monobutyl ether.

23. The ink set according to claim 21, containing 3.0 to 20.0 wt % of said lower alkyl glycol ether relative to the total weight of the ink.

24. The ink set according to claim 19, containing an acetylenic glycol type nonionic surfactant.

25. The ink set according to claim 24, containing 0.01 to 3.0 wt % of said acetylenic glycol type nonionic surfactant relative to the total weight of the ink.

26. The ink set according to claim 19, containing 3.0 to 50.0 wt % of the water-soluble organic solvent relative to the total weight of the ink.

27. An ink jet recording method of forming a color image using at least dark and light magenta ink, yellow ink, and dark and light cyan ink, the recording method using the ink set according to claim 19.

28. The ink set according to claim 12, wherein said dark magenta ink contains 1 to 5 wt % of the dye shown in said general formula (I) relative to the total amount of said dark magenta ink, said light magenta ink contains 0.5 to 4 wt % of the dye shown in said general formula (II) relative to the total amount of said light magenta ink, said yellow ink contains 0.3 to 4.0 wt % of at least one dye selected from the group consisting of a dye containing C.I. Direct Yellow 86 and C.I. Direct Yellow 132 in a weight ratio of 1:3 to 3:1, and a dye containing C.I. Direct Yellow 86 and C.I. Direct Yellow 173 in a weight ratio of 1:4 to 4:1, relative to the total amount of said yellow ink, and said cyan ink contains 1.0 to 4.0 wt % of at least one dye selected from the group consisting of C.I. Direct Blue 86 and C.I. Direct Blue 199 relative to the total amount of said cyan ink.

* * * * *